(12) United States Patent
Cappuccio

(10) Patent No.: US 11,273,770 B2
(45) Date of Patent: Mar. 15, 2022

(54) STORAGE ENCLOSURE FOR ROLLBACK VEHICLES

(71) Applicant: Louis W. Cappuccio, Hammonton, NJ (US)

(72) Inventor: Louis W. Cappuccio, Hammonton, NJ (US)

(*) Notice: Subject to any disclaimer, the term of this patent is extended or adjusted under 35 U.S.C. 154(b) by 0 days.

(21) Appl. No.: 17/170,115

(22) Filed: Feb. 8, 2021

(65) Prior Publication Data

US 2021/0253039 A1    Aug. 19, 2021

Related U.S. Application Data

(60) Provisional application No. 62/976,391, filed on Feb. 14, 2020.

(51) Int. Cl.
| | | |
|---|---|---|
| *B60R 11/06* | (2006.01) | |
| *B60P 3/07* | (2006.01) | |
| *B60R 11/00* | (2006.01) | |
| *B60R 9/06* | (2006.01) | |

(52) U.S. Cl.
CPC ............. *B60R 11/06* (2013.01); *B60P 3/07* (2013.01); *B60R 9/065* (2013.01); *B60R 2011/004* (2013.01)

(58) Field of Classification Search
CPC . B60R 11/06; B60R 9/065; B60P 3/07; B25H 5/00
USPC .................................................. 224/563, 404
See application file for complete search history.

(56) References Cited

U.S. PATENT DOCUMENTS

| | | | | |
|---|---|---|---|---|
| 2,722,352 A | * | 11/1955 | Dehnel ................... | B60R 11/06 224/404 |
| 5,730,577 A | * | 3/1998 | Jones ....................... | B60P 1/43 414/462 |
| 6,234,559 B1 | * | 5/2001 | Block ..................... | B60J 7/1621 296/100.06 |
| 6,955,385 B1 | * | 10/2005 | Boyer ..................... | B62D 33/02 296/37.6 |
| 6,974,171 B1 | * | 12/2005 | Taylor ..................... | B60R 11/06 160/40 |
| 7,182,177 B1 | * | 2/2007 | Simnacher ................ | B66F 3/12 187/211 |
| 7,445,268 B2 | * | 11/2008 | Faulkiner ................ | B60P 1/431 296/183.1 |
| 8,393,665 B2 | * | 3/2013 | Villano ................... | B60R 11/06 296/37.6 |

(Continued)

*Primary Examiner* — Justin M Larson
(74) *Attorney, Agent, or Firm* — Stuart M. Goldstein

(57) ABSTRACT

A tool storage enclosure for rollback vehicles has a front wall frame member which extends the length of the storage enclosure. This frame member has a cut out, center opening. The framework also comprises first and second lateral frame numbers which extend from opposite sides of the front wall member and the length the width of the enclosure. A plurality of partition frame members extend perpendicularly to the front wall member and parallel to the lateral frame members, the partition frame members establishing a central compartment and lateral compartment. The central compartment is configured to enclose the spooled cable winch of the rollback vehicle and the center opening is configured to allow cable from the winch to extend out a center opening. A hinged protective cover plate overlays the enclosure framework. Connector tabs are provided to attach the enclosure to the bed of the vehicle.

3 Claims, 8 Drawing Sheets

(56) References Cited

U.S. PATENT DOCUMENTS

| | | | |
|---|---|---|---|
| 8,839,998 B1* | 9/2014 | Robinson | B60R 11/06 |
| | | | 224/403 |
| 9,096,180 B1* | 8/2015 | Malin | B60R 11/06 |
| 9,499,106 B2* | 11/2016 | Reed, III | B60R 11/06 |
| 9,694,754 B2* | 7/2017 | Sterling | B60R 5/04 |
| 10,272,816 B1* | 4/2019 | Watkins | B60P 1/433 |
| 10,513,228 B2* | 12/2019 | Steele | B62D 65/024 |
| 11,001,205 B2* | 5/2021 | Reed, III | B60R 11/06 |
| 11,186,228 B2* | 11/2021 | Sawant | B60R 7/04 |
| 2007/0262602 A1* | 11/2007 | Nagle | B60P 3/122 |
| | | | 296/51 |
| 2011/0018411 A1* | 1/2011 | Steiger | B60P 3/14 |
| | | | 312/237 |
| 2018/0312115 A1* | 11/2018 | Reed | B62D 35/00 |
| 2021/0253039 A1* | 8/2021 | Cappuccio | B60R 11/06 |

\* cited by examiner ations Ser. No. 62/976,391, filed on Feb. 14, 2020.

STORAGE ENCLOSURE FOR ROLLBACK VEHICLES

RELATED APPLICATION

This application claims the benefit of provisional application Ser. No. 62/976,391, filed on Feb. 14, 2020.

FIELD OF THE INVENTION

The present invention generally relates to the field of automobile transport or rollback vehicles, and more particularly to tool storage enclosures for these types of vehicles.

BACKGROUND OF THE INVENTION

Rollbacks are the vehicles of choice in transporting automobiles, pick-up and other smaller trucks, and similar vehicles. A variety of tools, chains, and belts, and other rollback equipment and devices are utilized during the process of mounting, securing and maintaining vehicles on rollbacks. However, when this equipment is not being used, it is most often left lying around loose on or around the bed surface of the rollback in a haphazard manner, unorganized, and unsecured on the vehicle. This situation exposes expensive tools and other equipment to the elements, e.g. rain, ice, extreme temperatures. It creates an environment which promotes theft. As a practical matter, tools which are scattered about also will result in time wasted in locating such tools and their potential loss. Importantly, disorganized, scattered tools present a real safety hazard.

SUMMARY OF THE INVENTION

It is thus the object of the present invention to provide a storage enclosure specifically designed for rollback vehicles in which tools and other equipment can be safely stored and readily accessible when needed.

It is a further object of the present invention to provide a storage enclosure for rollback vehicles which allows for the organization of tools and other vehicle equipment.

It is another object of the present invention to provide a storage enclosure for rollback vehicles which creates additional storage capability for tools and equipment.

It is still another object of the present invention to provide a storage enclosure for rollback vehicles which protects tools and equipment from the weather and prevents theft.

It is a further object of the present invention to provide a storage enclosure for rollback vehicles which consolidates and houses tools and equipment, thereby eliminating safety hazards created by loose and scattered tools and equipment.

These and other objects are accomplished by the present invention, a storage enclosure for rollback vehicles comprising a storage enclosure framework having a front wall frame member which extends the length of the storage enclosure. This frame member has a cut out, center opening. The framework also comprises first and second lateral frame numbers which extend from opposite sides of the front wall member and the length the width of the enclosure. A plurality of partition frame members extend perpendicularly to the front wall member and parallel to the lateral frame members, the partition frame members establishing a central compartment and lateral compartment. The central compartment is configured to enclose the spooled cable winch of the rollback vehicle and the center opening is configured to allow cable from the winch to extend out a center opening. A hinged protective cover plate overlays the enclosure framework. Connector tabs are provided to attach the enclosure to the bed of the vehicle.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
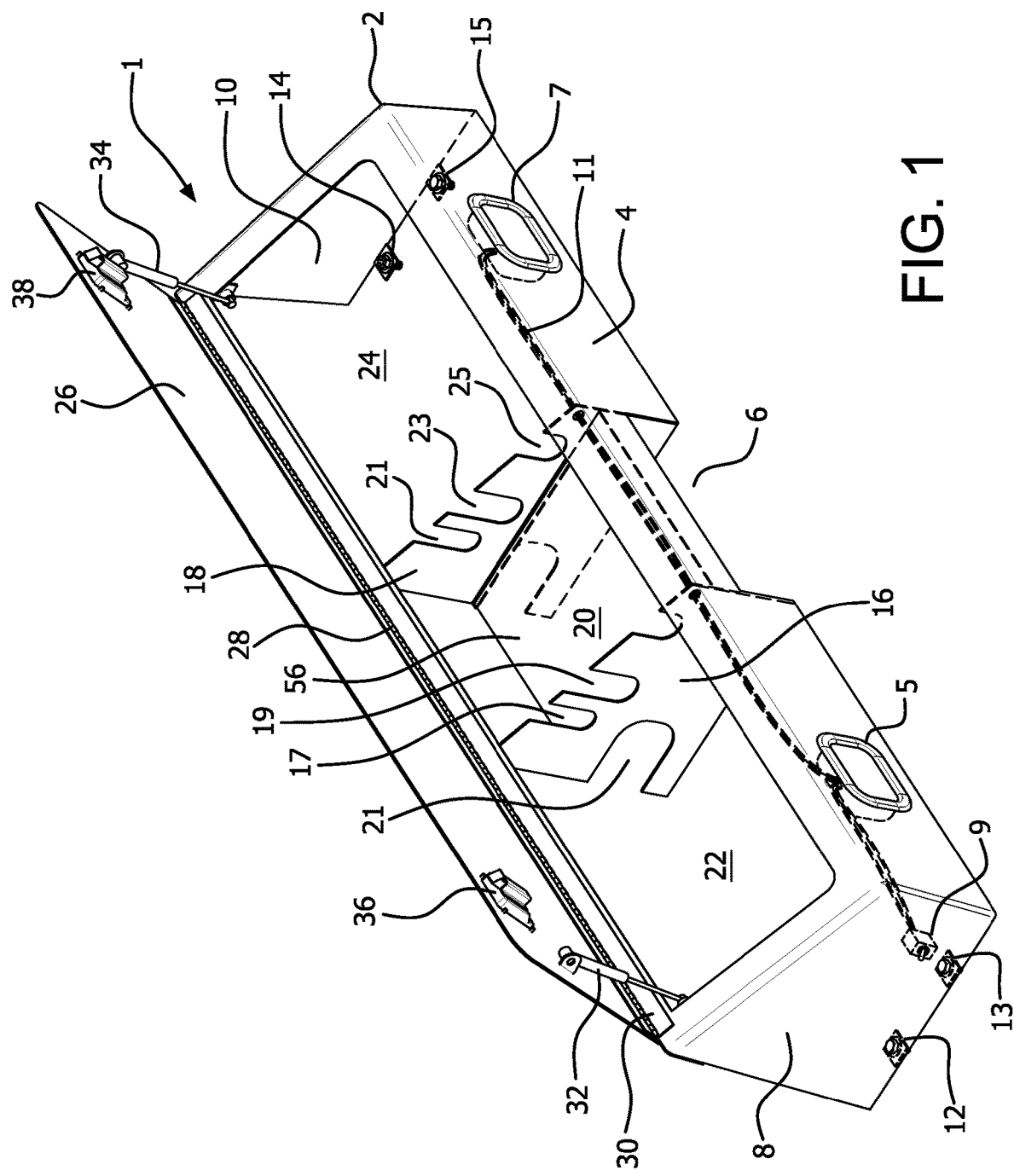
FIG. 1 is a front perspective view of just the storage enclosure of the present invention, with its winch cover plate opened, showing internals of the enclosure.
Figure 2:
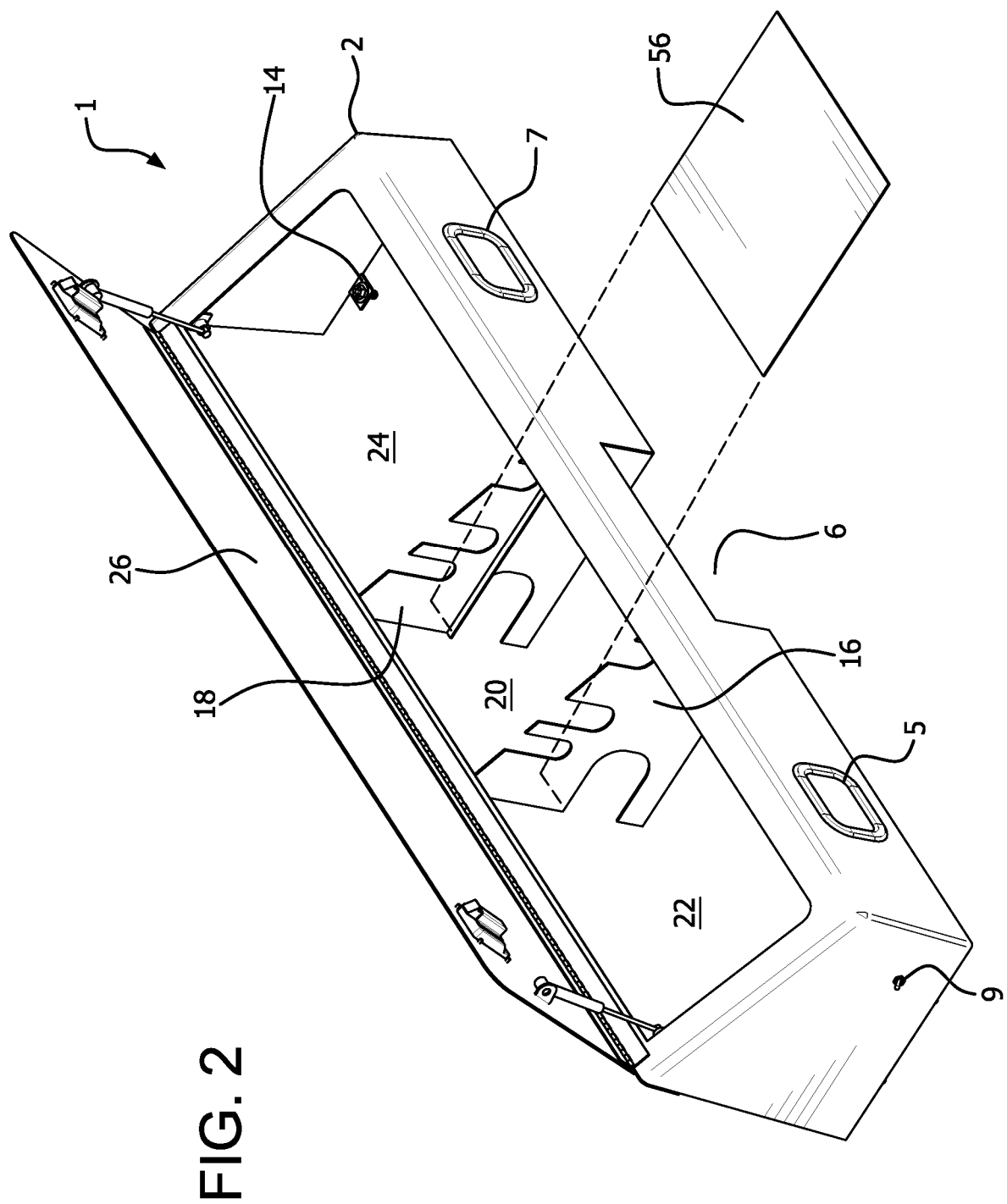
FIG. 2 is another perspective view of just the storage enclosure of the present invention with its cover plate open and the positioning of the winch cover plate.
Figure 3:
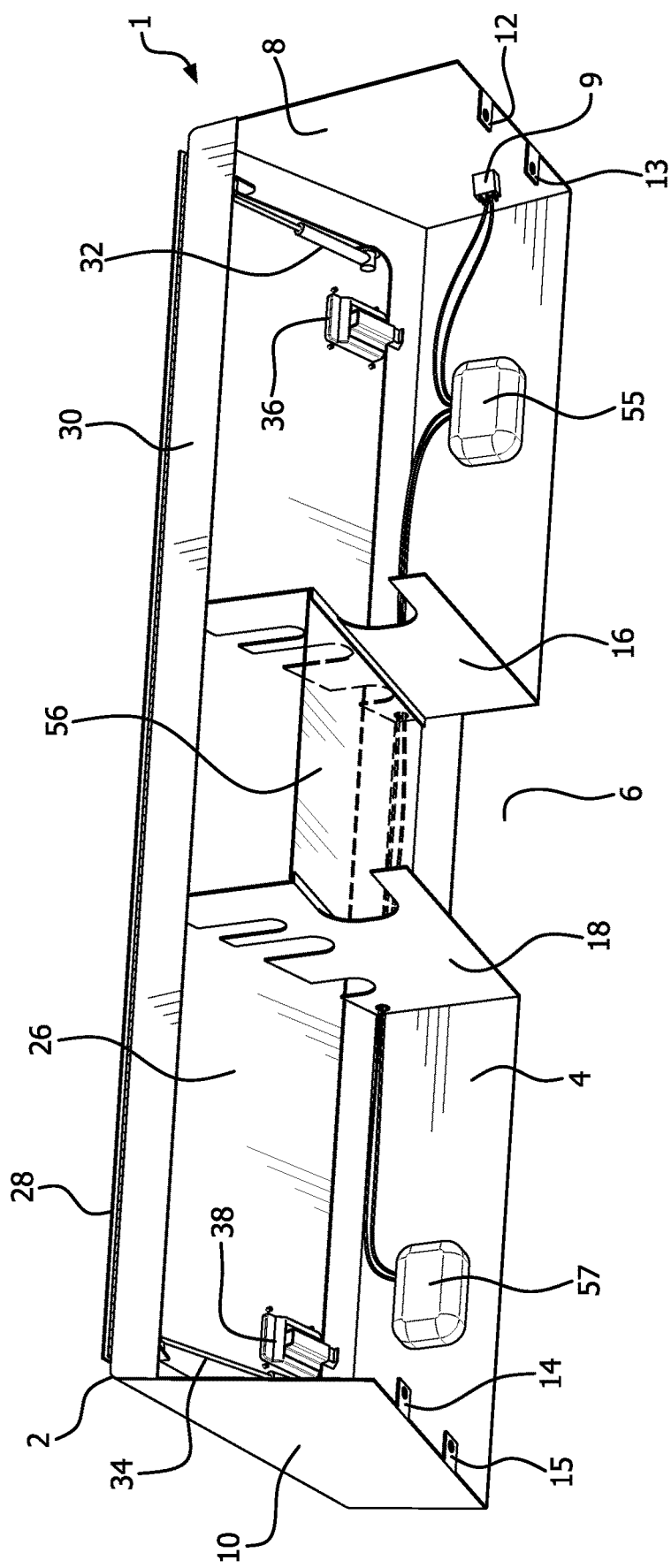
FIG. 3 is a rear perspective view of just the storage enclosure of the present invention with its cover plate closed.

With reference to FIGS. 1-3, storage enclosure 1 of the present invention comprises storage enclosure framework 2 which has front wall frame member 4 which extends the length of the enclosure and cut-out, center opening 6. Front wall frame member 4 has openings for the positioning of electrical lighting lamps 5 and 7 having internal protective boxes 55 and 57. Switch 9 on framework 2, or optionally positioned on the rollback vehicle itself, is electrically connected via wiring 11, to the vehicle electrical system.

Framework 2 also comprises lateral frame members 8 and 10 extending from opposite ends of front wall frame member 4. Lateral frame members 8 and 10 extend the width of framework 2. Attachment means in the form of connector tabs 12, 13, 14, and 15 extend from lateral frame member 8.

Partition frame members 16 and 18, having indented slots 17, 19, 21, 23, and 25 are attached to and extend perpendicularly to front wall frame member 4 and parallel to lateral frame members 8 and 10. Partition frame members 16 and 18 are secured to rear support 30 at their inboard ends. The partition frame members establish central compartment 20 and lateral compartments 22 and 24 between lateral frame members 8 and 10.

Cover plate 26 is rotatably mounted by piano hinge 28 to rear support 30, which itself is secured both to partition frame members 16 and 18 and lateral frame members 8 and 10. Piston operated gas shock supports 32 and 34 extend between cover plate 26 and lateral frame members 8 and 10. Latches 36 and 38 secure cover plate 26 in a closed position over framework 2 and hence cover compartments 20, 22, and 24. It is contemplated that any type of known latch can be utilized and this invention is not to be restricted to the latch disclosed herein.

Figure 4:
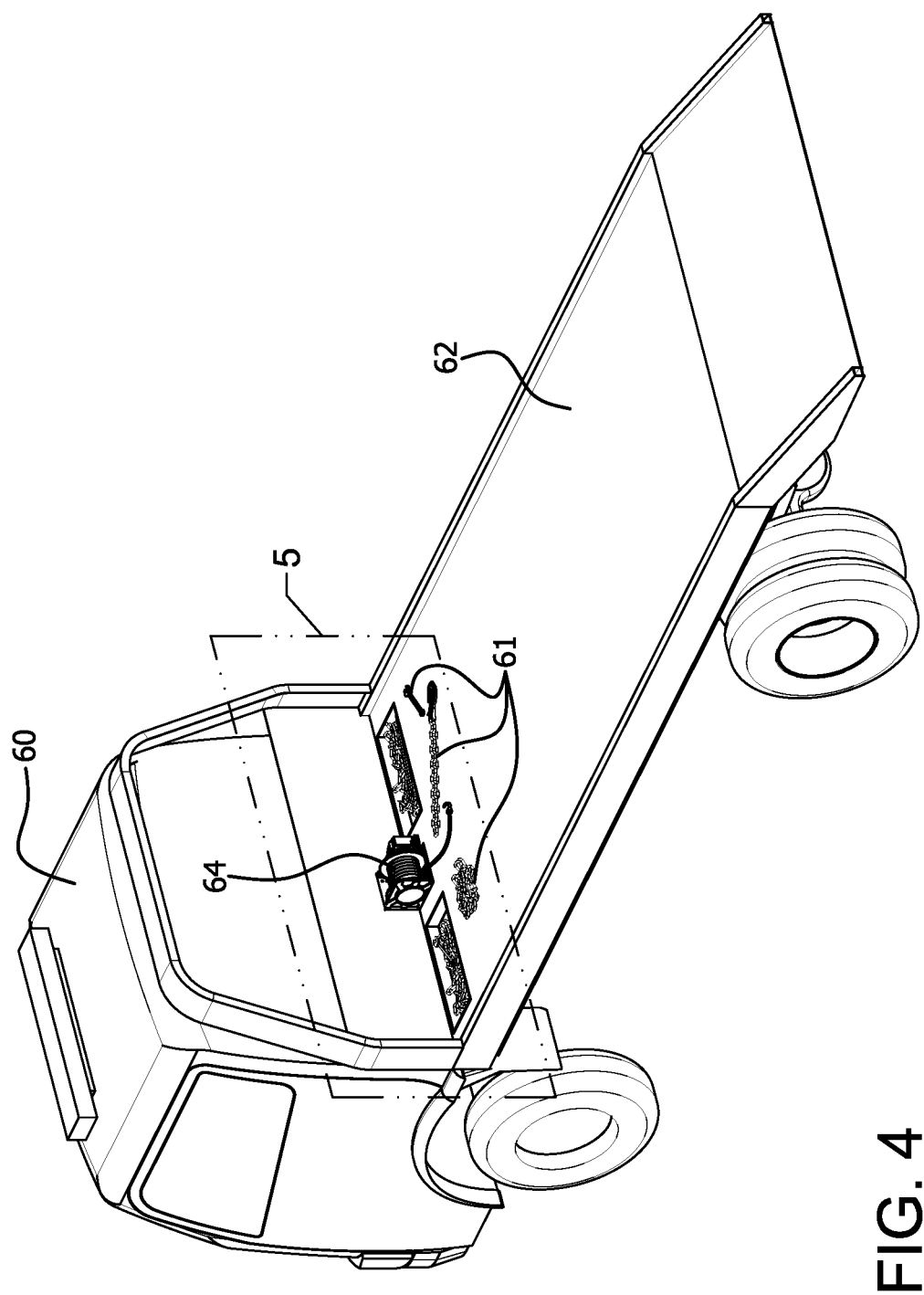
FIGS. 4 and 5 are perspective views of a typical rollback truck bed on which there are a winch, chains, tools, and other equipment, but without the benefit of the present invention.
Figure 5:
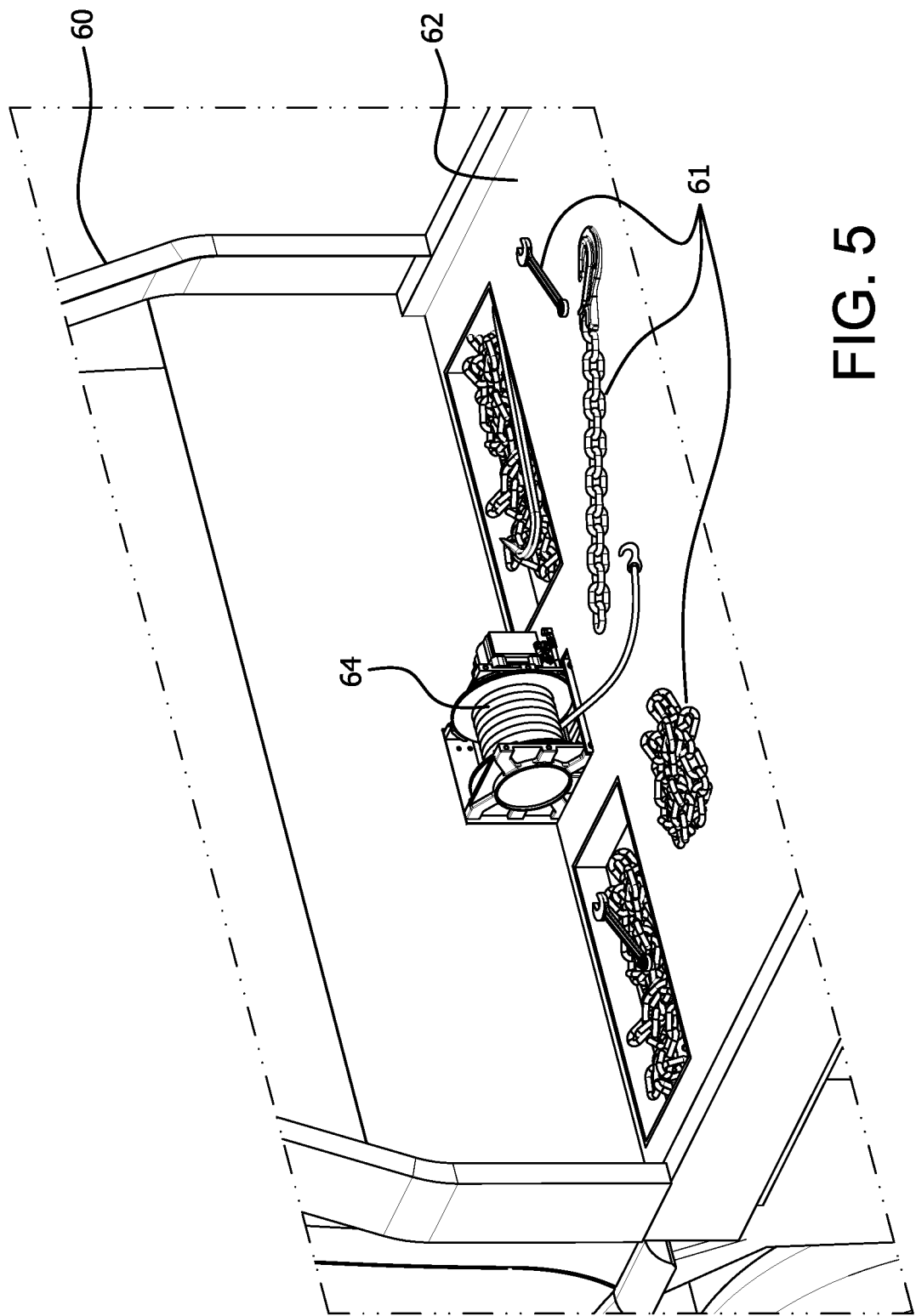
Figure 6:
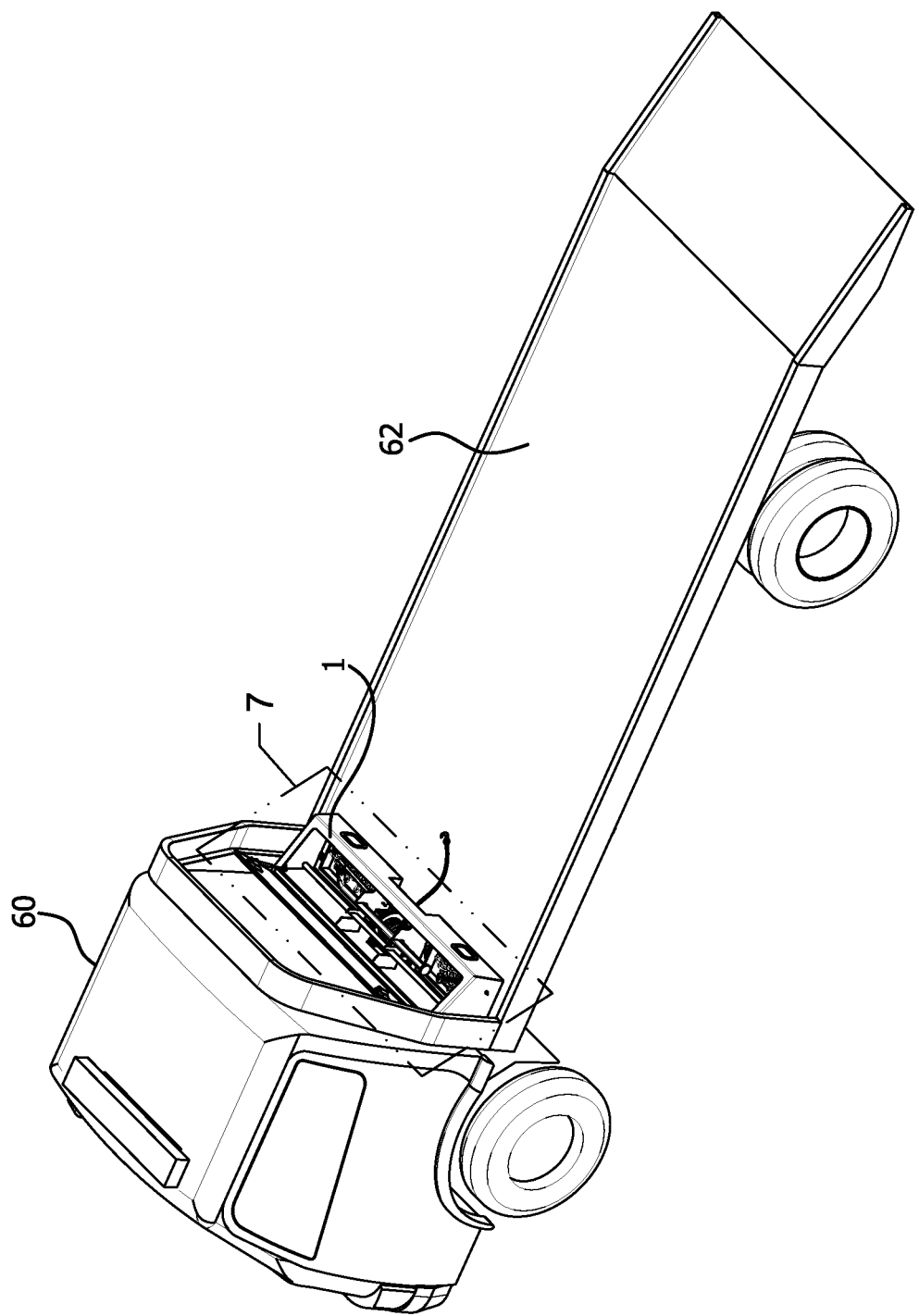
FIGS. 6 and 7 are rear perspective views of a rollback truck bed with the storage enclosure of the present invention installed and its cover plate open.
Figure 7:
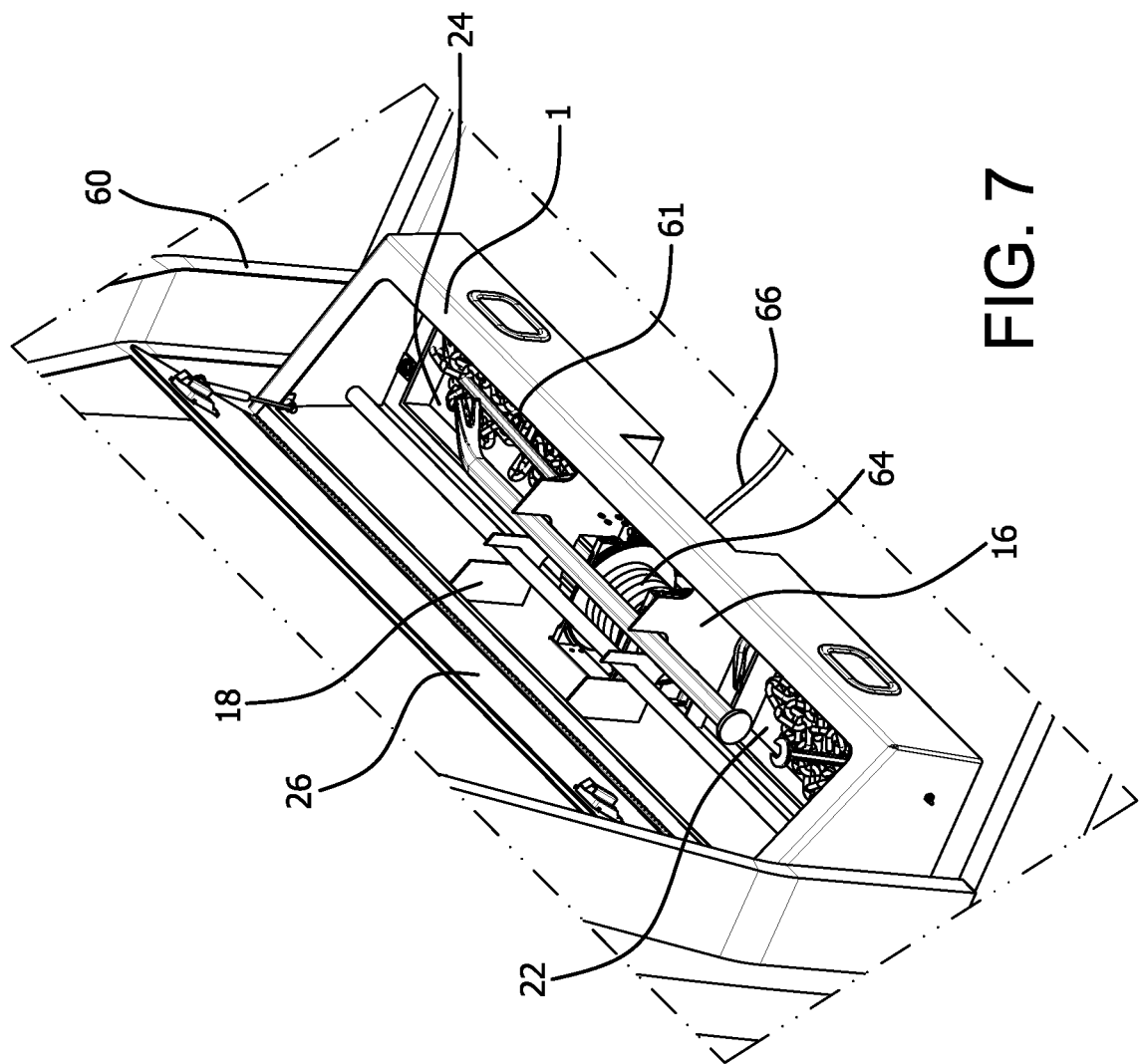
Figure 8:
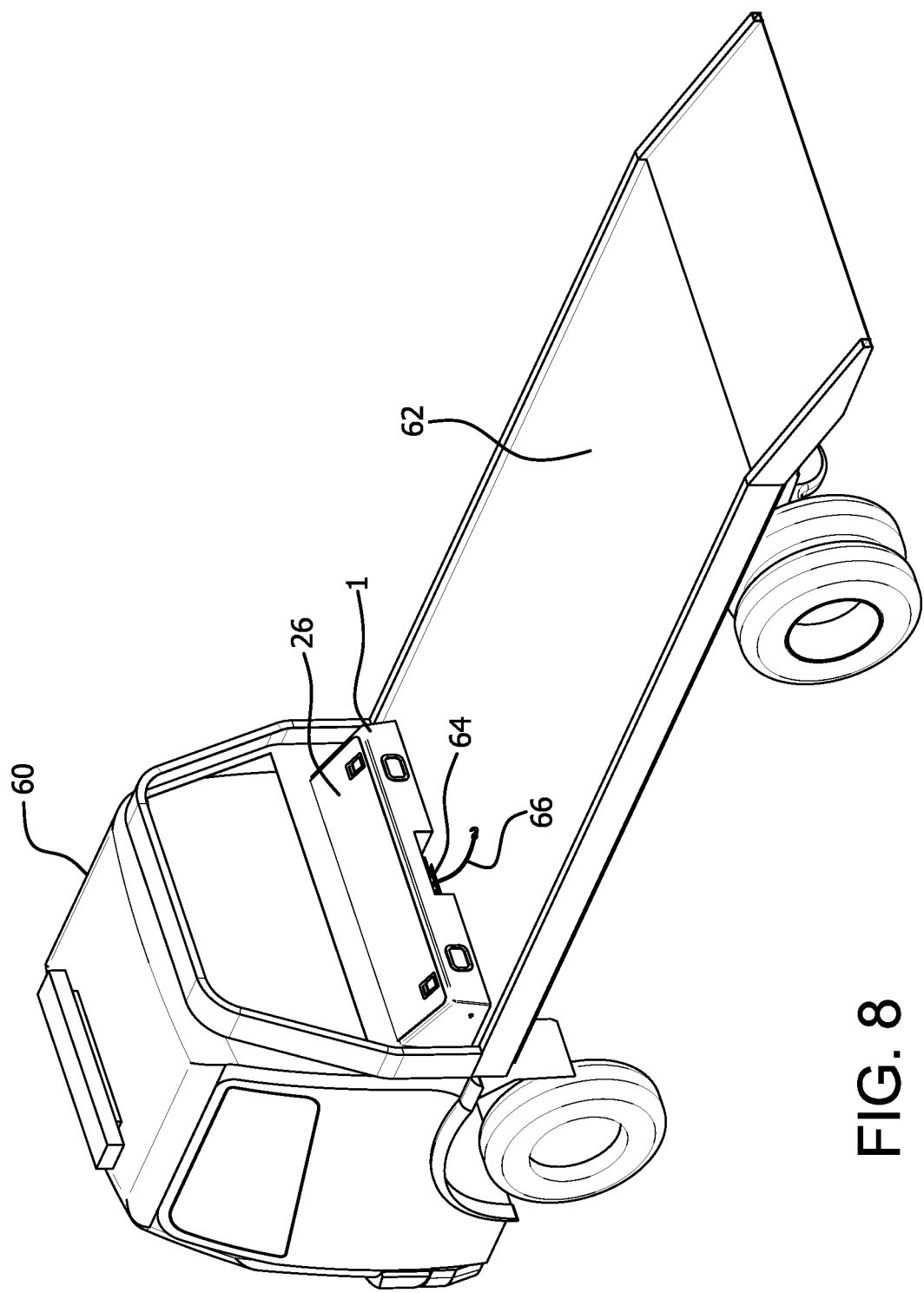
FIG. 8 is a rear perspective view of a rollback truck bed with the storage enclosure of the present invention installed and with its cover plate closed.

FIGS. 1 and 2 illustrate the disarray of tools and equipment 61 which is commonly found on bed 62 of a rollback vehicle 60 having spooled cable winch 64. On the other hand, FIGS. 3, 4, and 5 show how the storage enclosure 1 of the present invention on the body of a rollback vehicle eliminates the problems associated with the storage, safety, theft, and general protection of equipment and tools.

Storage enclosure 1 is secured to vehicle bed 62 of rollback vehicle 60 by connector tabs 12, 13, 14, and 15, via J-hooks attached to a meshed truck bed, by bolts through a solid bed, or other equivalent attachment means. Additional storage space over vehicle bed 62 for tools and equipment 61 is accomplished by means of compartments 22 and 24. Partition frame members 16 and 18 provide additional storage capability for elongated tools using slots 17, 19, 21, 23, and 25. Center compartment 20 provides a space for winch 64 of vehicle 60 and cut-out center opening 6 allows winch cable 66 to extend out storage enclosure 1. Removeable winch cover plate 56 is configured to cover and protect winch 54 in central compartment 20, as best seen in FIGS. 1 and 3. Additional storage space is provided over winch cover plate 56, which is supported by partition frame members 16 and 18.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A tool storage enclosure for a rollback vehicle having a vehicle bed on which a spooled cable winch is supported, said storage enclosure having a given length and a given width and comprising:

a storage enclosure framework comprising:
 a front wall frame member extending the length of the enclosure, said front wall frame member having a cut-out, center opening;
 first and second lateral frame members extending from opposite sides of the front wall frame member and extending the width of the storage enclosure; and
 a plurality of partition frame members extending perpendicularly to the front wall frame member and parallel to the lateral frame members, said partition frame members establishing a central compartment and lateral compartments between the first and second lateral frame members, said central compartment being configured to enclose the spooled cable winch and the center opening being configured to allow cable from the winch to extend out the center opening;
a hinged protective cover plate overlaying the enclosure framework configured to be rotated up to gain access to the central and lateral compartments; a winch cover plate covering the central compartment, said plate being supported by two of said plurality of partition frame members; and
enclosure attachment means to secure the storage enclosure to the rollback vehicle.

2. The tool storage enclosure as in claim 1 further comprising openings through the front wall frame member configured to accept lighting lamps.

3. The tool storage enclosure as in claim 1 wherein the attachment means comprises connector tabs protruding from the lateral frame members of the storage enclosure framework for securing the storage enclosure to the vehicle bed of the rollback vehicle.

\* \* \* \* \*